(12) United States Patent
Piszczek et al.

(10) Patent No.: US 10,918,967 B2
(45) Date of Patent: Feb. 16, 2021

(54) DUAL-DIVIDING WALL COLUMN WITH MULTIPLE PRODUCTS

(71) Applicant: ExxonMobil Research and Engineering Company, Annandale, NJ (US)

(72) Inventors: Robert Piszczek, Singapore (SG); Michael L. Hergenrother, Kingwood, TX (US); Brian D. Albert, Spring, TX (US); Jose X. Simonetty, Kingwood, TX (US); Brian W. Heins, Humble, TX (US); Vikram Singh, Houston, TX (US); Zhonghcheng Wang, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/137,750

(22) Filed: Sep. 21, 2018

(65) Prior Publication Data

US 2019/0091600 A1    Mar. 28, 2019

Related U.S. Application Data

(60) Provisional application No. 62/564,505, filed on Sep. 28, 2017.

(51) Int. Cl.
*B01D 3/14* (2006.01)
*C10G 7/00* (2006.01)

(52) U.S. Cl.
CPC ............... *B01D 3/141* (2013.01); *C10G 7/00* (2013.01)

(58) Field of Classification Search
CPC .................................. B01D 3/141; C10G 7/00
See application file for complete search history.

(56) References Cited

U.S. PATENT DOCUMENTS

| | | | |
|---|---|---|---|
| 6,106,674 | A | 8/2000 | Agrawal et al. |
| 6,291,734 | B1 | 9/2001 | Stork |
| 6,551,465 | B1 | 4/2003 | Van Zile et al. |
| 6,558,515 | B1 | 5/2003 | Steacy |
| 6,645,350 | B1 | 11/2003 | Steacy |
| 7,090,748 | B2 | 8/2006 | Kaibel et al. |
| 7,264,696 | B2 | 9/2007 | Kaibel et al. |

(Continued)

FOREIGN PATENT DOCUMENTS

EP    1681094 A2    7/2006

OTHER PUBLICATIONS

Tututi-Avila, et al., "Dividing-Wall Columns: Design and Control of a Kaibel and a Satellite Distillation Column for BTX Separation", Chemical Engineering and Processing, 2017, vol. 114, pp. 1-15.

(Continued)

*Primary Examiner* — Brian A McCaig
(74) *Attorney, Agent, or Firm* — Glenn T. Barrett

(57) ABSTRACT

Systems and methods are provided for separating a feedstock into a plurality of separation products using dividing wall column technology that includes a plurality of dividing walls. Including a plurality of dividing walls in the column can provide reduced energy consumption and reduced equipment footprint for production of a plurality of high purity distillation products. The systems and methods can allow for separation of a large number of products from a feed while having a reduced or minimized number of liquid splits and/or vapor splits.

23 Claims, 3 Drawing Sheets

(56) References Cited

U.S. PATENT DOCUMENTS

| | | |
|---|---|---|
| 7,267,746 B1 | 9/2007 | Harris et al. |
| 7,287,747 B2 | 10/2007 | Zich et al. |
| 7,357,378 B2 | 4/2008 | Zone et al. |
| 7,422,197 B2 | 9/2008 | Zone et al. |
| 7,498,471 B2 | 3/2009 | Schultz et al. |
| 7,528,290 B2 | 5/2009 | Zimmermann et al. |
| 7,556,717 B2 | 7/2009 | Heida |
| 7,604,222 B2 | 10/2009 | Zone et al. |
| 8,092,655 B2 | 1/2012 | Burst et al. |
| 8,480,860 B2 | 7/2013 | Kovak |
| 2014/0231238 A1 | 8/2014 | Bhargava et al. |
| 2015/0119612 A1 | 4/2015 | Agrawal et al. |

OTHER PUBLICATIONS

The International Search Report and Written Opinion of PCT/US2018/052126 dated Jan. 4, 2019.

US 10,918,967 B2

DUAL-DIVIDING WALL COLUMN WITH MULTIPLE PRODUCTS

CROSS-REFERENCE TO RELATED APPLICATIONS

This application claims the benefit of U.S. Provisional Application No. 62/564,505, filed on Sep. 22, 2017, the entire contents of which are incorporated herein by reference.

FIELD

Systems and methods are provided for performing separations using distillation columns with having a plurality of dividing walls.

BACKGROUND

Distillation columns or towers are one of the commonly found structures in a refinery setting. Distillation columns are used for separation of multiple product streams from an input stream using a reduced or minimized amount of footprint in the refinery. Additionally, distillation columns can be valuable for separation of products having adjacent, nearby, and/or overlapping boiling ranges.

Dividing Wall Columns (DWC) are distillation columns containing vertical dividing walls that partition a feed zone from one or more side product drawoff zones. DWC technology allows for reductions in the amount of equipment needed and/or the amount of energy required for performing one or more desired separations. The dividing walls can be used to separate the volume used for receiving input feed(s) to the column from the locations for withdrawal of product streams, thereby reducing product contamination. Additionally or alternately, the dividing walls can be used to create separate compartments for withdrawal of multiple product streams with high purity greater than 99 wt %.

Although dividing wall columns (DWC) can provide advantages for reduced energy consumption and/or refinery footprint, difficulties remain in implementing dividing wall column technology. For example, while a dividing wall column may have a theoretical level of efficiency, achieving the theoretical efficiency can be dependent on maintaining appropriate pressure balances within the dividing wall column. U.S. Pat. Nos. 7,090,748 and 7,264,696 provide examples of one strategy for improving the efficiency of a dividing wall column. Under the proposed strategy, the goal is to operate a dividing wall column so that the mass flow of gas within each portion of a dividing wall column has a specified ratio or scaling factor relative to the cross-sectional area of the portion. In some configurations, a desired ratio of gas mass flow to cross-sectional area for a given portion is achieved by having a portion of the dividing wall travel at an angle relative to vertical, to allow for different cross-sectional areas for portions at different heights within the column. However, increasing the number of high purity products and developing a method to operate a multi-partition dividing wall column are still desirable.

A journal article by Tututi-Avila et al. (Chemical Engineering and Processing, Vol. 114, pp 1-15 (2017)) shows configurations for dividing wall column distillation columns that include two dividing walls within a column, so that distinct separated volumes can exist at some heights within the column.

SUMMARY

In various aspects, a method for separating a feed into a plurality of products is provided. The method can include passing a feed into a feed entry volume defined by a first dividing wall and a second dividing wall in a distillation column. The interior of the distillation column can have two or less liquid splits and two or less vapor splits. Optionally, the feed entry volume can be in fluid communication with a top common volume and/or in fluid communication with a bottom common volume. In some aspects, the first dividing wall and the column wall can define a first tower section, which can contain one or more divided volumes. Similarly, in some aspects, the second dividing wall and the column wall can define a second tower section, which can contain another one or more divided volumes. Depending on the aspect, the distillation column can include any convenient number of divided volumes. This can include having a plurality of divided volumes in the first tower section and/or the second tower section.

Any convenient number of product streams can be withdrawn from divided volumes in the first tower section and/or the second tower section. For example, a first product stream can be withdrawn from the first divided volume of the distillation column; a second product stream can be withdrawn from the second divided volume of the distillation column; optionally a third product stream can be withdrawn from the first divided volume of the distillation column; optionally a fourth product stream can be withdrawn from the second divided volume of the distillation column; and optionally still other product streams can be withdrawn from divided volumes in the tower sections and/or generally withdrawn from the distillation column. Such other product streams can include, for example, a bottom product stream withdrawn from a bottom common volume and/or a top product stream withdrawn from above a top packed bed of the distillation column. Optionally, the third product stream can be less volatile based on normal boiling point than the second product stream. Optionally, the fourth product stream can be less volatile based on normal boiling point than the third product stream.

In various aspects, a system for performing separations of a feed into a plurality of products is also provided. The system can include a distillation column comprising a top common volume, a bottom common volume, an intermediate volume, and a column wall. The intermediate volume can include a first dividing wall and a second dividing wall. Optionally, the first dividing wall and the second dividing wall can define at least a feed entry volume. Optionally, the first dividing wall and the column wall can define a first tower section comprising a first plurality of divided volumes while the second dividing wall and the column wall can defining a second tower section comprising one or more additional divided volumes, such as a second plurality of divided volumes. The interior of the distillation column can preferably include two or less liquid splits and two or less vapor splits.

The system can further include a feedstock inlet in fluid communication with the feed entry volume and a plurality of product outlets. For example, the system can further include at least one top outlet in fluid communication with the top common volume or with a volume above a top packed bed; at least one bottom outlet in fluid communication with the bottom common volume; a first outlet in fluid communication with a first divided volume of the first plurality of divided volumes; and a second outlet in fluid communication with a second divided volume of the second plurality of divided volumes. Optionally the system can further include third outlet in fluid communication with a third divided volume of the first plurality of divided volumes and/or a fourth outlet in fluid communication with a fourth divided volume of the second plurality of divided volumes. In such optional aspects, an elevation of the third outlet can be lower than an elevation of the first outlet and/or an elevation of the fourth outlet can be lower than an elevation of the second outlet. Optionally, a top of the first dividing wall is at a different height within the distillation tower than a top of the second dividing wall and/or a bottom of the first dividing wall is at a different height within the distillation tower than a bottom of the second dividing wall.

In various aspects, at least one of the first dividing wall and the second dividing wall can correspond to a plurality of substantially parallel dividing wall sections. In such aspects, at least one dividing wall section of the plurality of substantially parallel dividing wall sections can be horizontally offset from at least one other dividing wall section of the plurality of substantially parallel dividing wall sections.

In various aspects, the systems and/or methods can further include a temperature differential between a divided volume in the first tower section (optionally the first divided volume) and a location on an opposing side of the first dividing wall is 10° C. to 35° C.; or wherein a temperature differential between a divided volume in the second tower section (optionally the second divided volume) and a location on an opposing side of the second dividing wall is 10° C. to 35° C.; or a combination thereof.

In various aspects, the first dividing wall and/or the second dividing wall can correspond to a first wall structure and a second wall structure separated by a wall gap of 0.7 cm to 7.6 cm (or 1.2 cm to 5.1 cm).

In various aspects, the distillation column can include a plurality of horizontally adjacent packed beds on opposing sides of the first dividing wall and/or the second dividing wall. In some aspects, the packed beds on one side of a dividing wall can have an average percent vapor flood that is within 10% of an average percent vapor flood of the horizontally adjacent packed bed on the opposing side of the dividing wall.

In various aspects, a vapor split ratio for vapor split(s) associated with the first dividing wall and/or the second dividing at a first feed rate can be substantially similar to a vapor split ratio for the corresponding vapor split(s) at a second feed rate. In such aspects, the first feed rate and the second feed rate can optionally differ by at least 25%.

In various aspects, a packing type, a packing size, or a combination thereof in at least one packed bed in a tower section is different from a packing type, a packing size, or a combination thereof on an opposing side of the dividing wall that defines the tower section, such as the first tower section and/or the second tower section. In such aspects, the at least one packed bed can optionally correspond to a packed bed in a divided volume.

DETAILED DESCRIPTION

Overview

Figure 1:
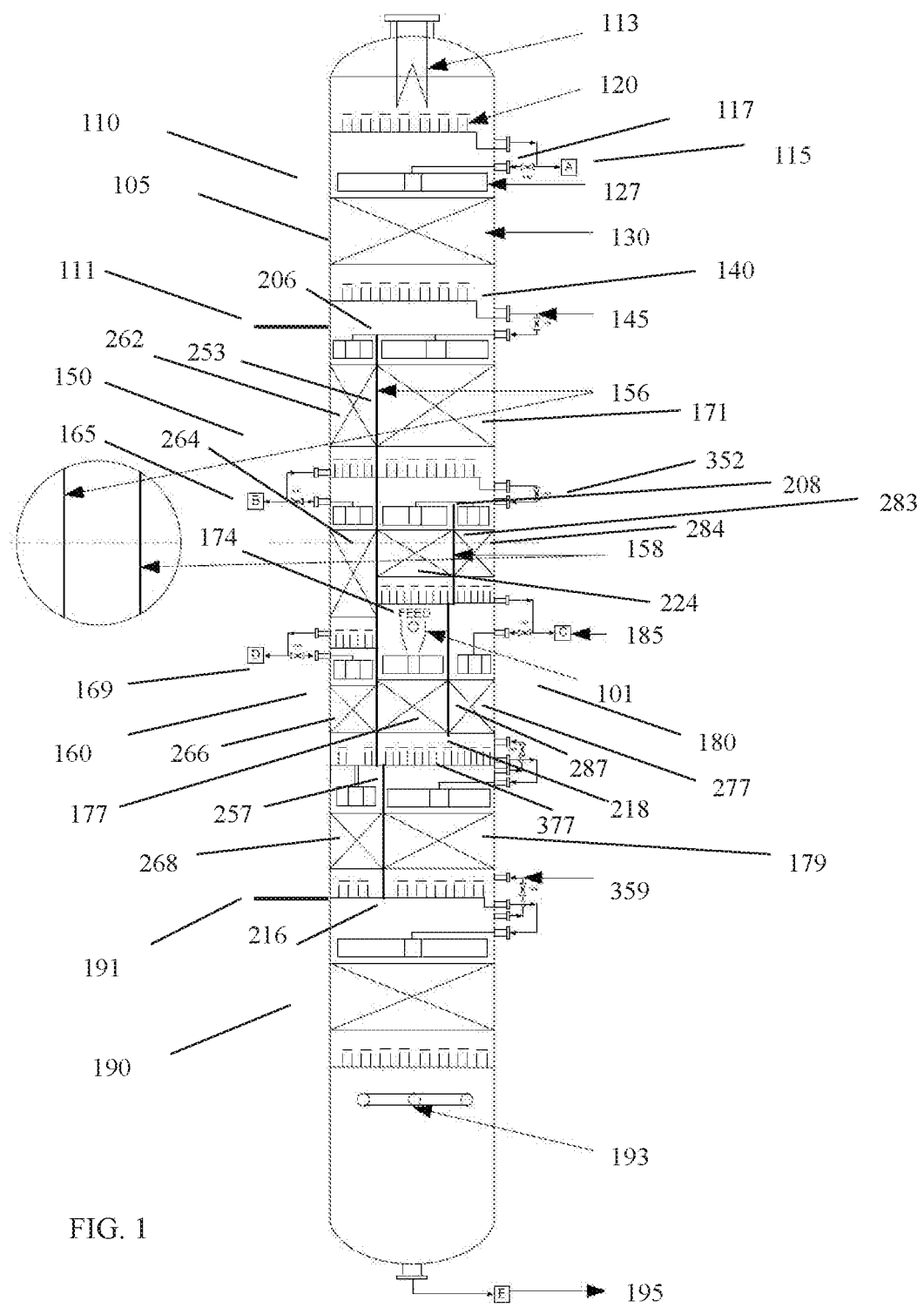
FIG. 1 shows an example of a dividing wall column configuration that allows for separation of at least five products from a feed while having two vapor splits and two liquid splits within the column.

In various aspects, systems and methods are provided for separating a feedstock into a plurality of separation products using dividing wall column technology that includes a plurality of dividing walls. Including a plurality of dividing walls in the column can provide reduced energy consumption and reduced equipment footprint for production of a plurality of high purity distillation products. For example, the plurality of dividing walls can allow the feed to the distillation column to be delivered to a feed entry volume that is separate from the divided volumes where the side drawoff products are withdrawn from the column. For a column including two or more dividing walls, this can correspond to introducing the feed into a volume that is between two dividing walls within the column.

Additionally or alternately, in various aspects configurations and/or methods as described herein can be used to allow for production of 5 or more products (or 6 or more products) from a dividing wall column containing a plurality of dividing walls while having a maximum of two vapor splits and two liquid splits. Reducing or minimizing the number of vapor splits and/or liquid splits in a dividing wall column configuration can be beneficial as each split corresponds to a location where flows have to be managed so that the pressure is equalized at the split point. Therefore, reducing or minimizing the number of splits can reduce the number of constraints on the flows within the system and reduce the complexity of the design and operation. It is noted that when counting the number of products, a top product and a bottoms product from the divided wall column can correspond to products that are withdrawn from common packed beds within the dividing wall column. With regard to the bottoms product, it is noted that at least a portion of the bottoms product can typically be recycled as part of a reboiler loop to provide additional heat to the distillation column.

In some aspects, generating 5 or more products from a dividing wall column containing two or more dividing walls may require maintaining a temperature differential of at least 10° C. across at least one dividing wall, or at least 20° C., or at least 25° C., such as up to 35° C. or possibly more. Maintaining a temperature differential across at least one dividing wall may allow products with different boiling ranges to be withdrawn at a similar height or elevation in the column while still achieving a high purity of 99 wt %.

In some aspects, generating 5 or more products from a dividing wall column can be facilitated by having different packing types and sizes on opposite sides of a dividing wall. Use of different packing types and sizes would be design considerations to optimize the tower design to improve or maximize utilization and reduce or minimize waste volume. As a result of using different packing types and sizes, the pressure drop, capacity and packing efficiency for each horizontally adjacent packed bed section may vary. This can potentially cause the ratio of gas mass flow to cross-sectional area to vary within various portions of the dividing wall column.

In some aspects, 5 or more products can be generated from a dividing wall column while operating the column at a pressure of 100 kPa or more, or 150 kPa or more, while still having a maximum of 2 liquid splits and 2 vapor splits. Operating a column at higher pressure can be beneficial, for example, for separation of some lower boiling feeds, such as separation of benzene, toluene, and xylenes from an aromatic feed.

It has been discovered that during operation of a distillation column, it can be desirable to have substantially equal flood percentages for packed beds in divided volumes where side drawoff products are withdrawn. When operating a distillation column with substantially equal flood percentages, a target flood percentage can be identified that is within a threshold amount of the flood percentages for any packed beds in divided volumes wherein side drawoff products are withdrawn.

In some aspects, the distillation column can be designed to have a roughly equal average percent flood in each divided (i.e., adjacent) section of a packed bed. The divided sections are separated from each other by the dividing wall(s). Designing for approximately equal percent flood for each divided section is expected to maintain constant vapor flow split and maximize the overall hydraulic capacity of the column to handle an increase in feed flow, as each of the packed beds in the divided volumes has a similar amount of remaining capacity. This may allow the use of different packing types and sizes for each tower section depending on the separation requirements. Additionally or alternately, operating with roughly equal percent flood can allow for flexibility in processing feeds with varying compositions, as the pressure drop across the packed beds can have a reduced or minimized variability as the amount of compounds in a particular boiling range changes between feeds. This is in contrast to attempting to operate the distillation based on control of the gas flows within one or more of the divided volumes defined by the dividing walls which may constrain the packing selection to similar packing type and size for the horizontally adjacent packed beds. In this discussion, operating with roughly equal average percent vapor flood in adjacent packed beds is defined as operating with average percent vapor flood values that differ by less than 10%. One potential benefit of operating with roughly equal average percent vapor flood values is that this can allow a dividing wall column to maintain substantially similar vapor split ratios when operating at substantially different feed rates to the column. A substantially different feed rate is defined as having a first feed rate that differs from a second feed rate by 25% or more. A substantially similar vapor split ratio is defined as having a first vapor split ratio that differs from a second vapor split ratio, for the same vapor split, by less than 10%.

In some aspects involving configurations for generating at least four products from a dividing wall column, at least one of the dividing walls can correspond to a plurality of dividing wall sections, with at least one dividing wall section being horizontally offset or staggered relative to at least another dividing wall section. Having an offset wall section can change the relative cross-section of the divided volume(s)/tower sections defined by the plurality of wall segments. This can assist with maintaining a constant flood volume percentage across various packed beds by modifying the total volume available for flooding within a given packed bed. Additionally or alternately, using an offset wall configuration can provide an increased amount of usable packed bed volume within a distillation column relative to a configuration that involves a single, contiguous dividing wall with an angled section. For example, the stagger or offset location for a stagger wall can occur within a column internal component, such as within a chimney tray. Having the stagger location occur within a column internal can reduce or minimize any potential impact of the wall stagger on the fluid flow within the column. A stagger location within a column internal can also reduce or minimize the amount of volume that is not occupied by a packed bed. A dividing wall column (DWC) with an angled dividing wall may result in a design with more waste volume than a DWC using staggered dividing walls. For example, DWC configurations that employ a sloped or angled dividing wall typically do not have a packed bed adjacent to the sloped portion of the dividing wall. This can result in leaving a substantial portion of the column volume empty.

In some aspects, the plurality of dividing walls can allow multiple products to be withdrawn from various divided volumes while reducing or minimizing the height of the packed bed(s) between the multiple products. In a conventional distillation column, the products withdrawn from adjacent heights in the column typically correspond to products with overlapping or adjacent boiling ranges. By creating divided volumes for withdrawal of side drawoff products, products with higher purity can be withdrawn from distinct divided volumes. For example, a distillation column including two dividing walls can have a feed entry volume and a plurality of divided volumes separated from the central volume for withdrawal of products. If three side drawoff products are desired in addition to the top and bottom product, two of the three side drawoff products can be withdrawn from divided volumes defined in part by a first dividing wall (corresponding to a first tower section) the remaining side drawoff product can be withdrawn from a divided volume defined in part by a second dividing wall (corresponding to a second tower section). In such aspects, the withdrawal locations can be configured so that the boiling range of the side drawoff product withdrawn from the second tower section can correspond to a boiling range between the products withdrawn from the second tower section. This configuration can reduce or minimize the number of equivalent trays needs to achieve a desirable separation between products. This configuration is expected to reduce the height of the packed bed(s) located between the two side drawoff product withdrawal locations in the first tower section. For example, instead of the typical requirement of at least 10 equivalent trays for suitable separation of products, the packed bed between the product withdrawal locations in the first tower section can correspond to 5 equivalent trays or less depending on the change in relative volatility between the vertically adjacent side products.

Operating with roughly constant percent flood in the divided volumes can be in contrast to conventional strategies for operating a dividing wall column. Examples of conventional strategies for dividing wall column operation include operating at constant ratio of gas mass flow to cross sectional area in the divided volumes, which may not fully utilize tower capacity, efficiency, or allow for different types of packings and sizes for each divided section.

Definitions

In this discussion, a dividing wall is defined as a partition wall or other barrier that prevents fluid flow that is disposed roughly parallel to/passes through the central axis of a distillation column. The dividing wall can intersect with the interior wall of the distillation column (referred to as the column wall) in one or more locations, such as intersecting in two locations. The dividing wall can typically have a height that is less than the interior height of the distillation column.

In this discussion, a divided volume is defined as a volume within a distillation column that is bounded laterally by at least one dividing wall and either the column wall or a second dividing wall. This is in contrast to a common volume within a distillation column, which refers to a volume that spans substantially the entire interior cross-section of the distillation column at the heights/elevations corresponding to the common volume. Divided volumes have substantially no fluid communication laterally through a dividing wall. Instead, any fluid communication between divided volumes that are separated by a dividing wall is indirect, based on fluid communication via, for example, an upper common volume or a lower common volume. The vertical boundaries for a divided volume are based on the packed beds and other associated internals in the dividing wall column. In this discussion, the vertical boundaries of a divided volume are defined as the top of the liquid distributor tray(s) (or other flow distributor) located above a packed bed to the bottom of the chimney tray, liquid withdrawal tray, or another structure suitable for product withdrawal below the same packed bed. If a liquid/flow distributor is not present above a packed bed, then the divided volume starts at the top of the packed bed. If a chimney tray or other comparable structure is not present below a packed bed, then the divided volume ends at the structure that starts the next divided volume. It is noted that the divided volumes in a dividing wall column do not need to be contiguous under these definitions. It is further noted that the feed entry volume may not correspond to a divided volume. For example, the feed entry volume may correspond to a volume between a chimney tray and a flow distributor. Finally, it is noted that a packed bed and associated internals may not correspond to a divided volume under this definition if a portion of the associated internals are beyond the dividing wall. For example, two sections of adjacent packed beds may be separated by a dividing wall, but may share a common chimney tray that is below the level of the dividing wall. This type of internal configuration falls outside of the definition of a divided volume.

In this discussion, a tower section corresponds to a portion of the tower that is defined in part by a lateral boundary formed by a dividing wall, with a top and bottom defined by the top and bottom of the corresponding dividing wall. For a section that is bound on multiple sides by a dividing wall, the lowest elevation top and the highest elevation bottom can be used to define the section. A tower section can include one or more divided volumes.

In this discussion, a liquid split is defined as a location corresponding to a top of a dividing wall where two horizontally adjacent packed beds are divided and the liquid flow rates to the top of these beds are manipulated to achieve the desired component separation in each packed bed. In this discussion, a vapor split is defined as a location corresponding to a bottom of a dividing wall where two horizontally adjacent packed beds are divided and the vapor ratio to each side of the dividing wall is set by the design of the column internals.

In this discussion, a packed bed is defined according to the conventional definition. Therefore, a packed bed has an available volume between the particles/structures and/or in the pores in the packed bed for holding a fluid. References to a total volume for a packed bed correspond to this available volume. In this discussion, percent vapor flood for a packed bed is defined as the percent capacity relative to the flood point, which is defined by Fractionation Research, Inc. (FRI). In this discussion, a target percent flood corresponds to a value for comparison with the percent flood for packed beds within the divided volumes in a distillation column.

In this discussion, side drawoff products refer to distillation products other than products withdrawn from the top common volume or the bottom common volume.

In this discussion, references to boiling points or distillation points correspond to distillation points as determined according to ASTM D2887, or alternatively according to ASTM D86 and/or ASTM D7169 if ASTM D2887 is unsuitable due to the nature of the sample. References to "Tx" distillation points refer to a fractional weight "x" of a sample that can be distilled at the identified temperature. For example, a T10 distillation point corresponds to a temperature at which 10 wt % of a sample can be distilled. In this discussion, boiling points and/or ranges for fractions that include compounds corresponding to light ends (i.e., $C_1$ to $C_4$ compounds) may be described based on the carbon number of the hydrocarbons that are included within a fraction, in accordance with the common practice by those of skill in the art. For example, a boiling range that is described as $C_4$ to 200° C. represents a boiling range that has a sufficiently low endpoint to include $C_4$ hydrocarbons. Similarly, a light ends fraction corresponding to $C_1$ to $C_4$ compounds can have a boiling range with a sufficiently low endpoint to include methane and a sufficiently high endpoint to include $C_4$ hydrocarbons.

In this discussion, two product streams can be compared based on the volatility of the streams as determined by normal boiling point. In this discussion, comparing the volatility of two streams based on normal boiling point is defined as comparing the streams based on the T50 boiling points of the streams at normal conditions (i.e., 1 atm or ~100 kPa-a). A first stream is defined as having lower volatility than the second stream if the T50 boiling point of the first stream is higher than the corresponding T50 boiling point of the second stream.

In this discussion, fluid communication can refer to direct fluid communication or indirect fluid communication. Indirect fluid communication refers to the ability for fluids to pass from a first volume to a second volume via an intervening volume.

In this discussion, the term substantially parallel refers to a wall/wall section that is oriented to within 10° or less of being parallel to an axis or another wall/wall section.

In this discussion, opposing locations for a dividing wall are defined as locations adjacent to a dividing wall at a given location that are on opposite sides of the dividing wall.

Dividing Wall Column as a Fractionator

In various embodiments, a dividing wall column including one or more dividing walls can be employed as a fractionation tower/distillation column. The dividing wall column can contain a plurality of separate volumes. One of the volumes is a common volume toward the top of the dividing wall column. Another volume is a common volume toward the bottom of the dividing wall column. Still other volumes in the dividing wall column represent volumes with at least one lateral boundary that is defined by a dividing wall. At least one of the volumes can correspond to a feed entry volume where feedstock for separation can enter into the fractionation tower. Some other volumes can correspond to divided volumes wherein one or more products are withdrawn from the column. Still other volumes (optionally corresponding to divided volumes) can correspond to volumes that are not involved with either feed entry or product withdrawal.

It is noted that having the feed enter a feed entry volume that is different from the divided volumes for withdrawal of the product fractions can provide a benefit similar to a distillation configuration that involves the use of satellite towers. In particular, in such a configuration, the feed entry volume that receives the feed will not be in direct fluid communication with the divided volume(s) for product withdrawal. Instead, in order for the feed to enter a divided volume for product withdrawal, the feed passes through at least one other divided volume and/or at least one common volume.

The volumes can be arranged in any configuration that is convenient for the desired fractionations. The position of the dividing walls can be any convenient position that leads to the appropriate volumes for the divided volumes. For a dividing wall column having a roughly round cylindrical shape, one option is to have dividing walls that correspond to chords between two points on a circle defined by a cross-section of the column.

In some aspects, the diameter of a dividing wall column can be selected so that the cross-sectional areas of the sections created by the dividing walls roughly corresponds to the cross-sectional areas of the individual (satellite and primary) fractionation columns that are being replaced. In an embodiment, the cross-sectional areas of the tower sections can be within about 10% or less of the cross-sectional areas of the individual fractionation columns being replaced, or within about 5% or less.

In various aspects, the interior of the divided wall column can include typical components of a fractionator. For example, one or more packed beds and/or series of trays can be located in the dividing wall column to assist with fractionation. Some of the trays can be located in the common volume(s). Other packed beds and trays can be located in the tower sections. The tray locations and/or spacing in the tower sections can be the same or different for each divided volume. As an alternative to trays, any other type of internal structure typically found in a fractionator can be used, such as grids, liquid and vapor distributors, and liquid and vapor collectors. The dividing wall column can also include other typical fractionator parts, such as a flash zone and/or a sump.

Variations in Packed Beds on Opposing Sides of Dividing Walls

The number of vapor splits and liquid splits in a dividing wall distillation column is typically correlated with the difficulty in controlling the conditions within the column. Each vapor split and each liquid split in a column represents a transition line.

At a location immediately above the liquid split, the pressure (by definition) will be substantially the same on either side of an imaginary line extending upward from the top of the dividing wall. At locations just below the top of the dividing wall, the pressure in the divided volumes on opposite sides of the dividing wall can start to diverge. The vapor split at the bottom of such a dividing wall provides the same type of boundary condition, with a requirement that the pressures are equalized just below the vapor split. The boundary conditions imposed by the liquid split and vapor split at the top and bottom of a dividing wall can pose design challenges for maintaining desirable flow rates in the various volumes of the distillation column.

Conventionally, managing the flows on either side of a dividing wall column has been managed by limiting the nature and types of differences on the opposing sides of a dividing wall. As an example, conventional dividing wall columns have used the same type of packed bed throughout a column. By using the same type of packing material, and by having packed beds of matching depths on either side of dividing walls, the pressure drops on either side of a dividing wall can be similar and therefore the amount of fluid flow in the volumes defined by the dividing wall can be relatively predictable.

In contrast to conventional configurations, in various aspects dividing wall columns can be used that allow for divergent fluid properties on opposing sides of a dividing wall for at least some locations. Structurally, the variations in fluid properties can be achieved by including structures with different pressure drops on opposing sides of a dividing wall. For example, instead of having packed beds of similar packing type, size, and depth on each side of a dividing wall, the packed beds on opposing sides of a dividing wall can be varied. Because the pressures must be equal at the top and bottom of the dividing wall, differences in the packed beds on opposing sides of a dividing wall near the top of the wall can eventually be balanced by other differences toward the bottom of the dividing wall.

Another type of variation that can assist with having divergent fluid properties on opposing sides of a dividing wall can correspond to a variation in the cross-sectional area for the divided volumes on opposing sides of a wall while reducing or minimizing the amount of waste volume created in the column. Changing the cross-sectional area can change the relative pressure drop on both sides of a dividing wall. For example, in a tower section having a constant cross-sectional area, if all beds in the tower section have the same packing type, size, and cross-sectional area, the pressure drop across each packed bed can be primarily determined by the depth of the bed. However, if the cross-sectional area of one of the packed beds is larger while keeping the same packing material/packing density/bed depth, the overall pressure drop across such a packed bed can be lower due to the increased area that is available to accommodate the flow.

With regard to temperature variations, in various aspects the temperature variations at locations on opposing sides of a dividing wall can be controlled to be less than a threshold value. In various aspects, the temperature differences on opposing sides of a dividing wall can be constrained to be about 35° C. or less, or about 30° C. or less. For a divided wall column that has temperature variations on opposing sides of a dividing wall, examples of temperature differentials for at least one elevation can correspond to temperature differentials of 10° C. to 35° C., or 15° C. to 35° C., or 20° C. to 35° C., or 10° C. to 30° C.

In some aspects, maintaining a temperature variation on opposing sides of a dividing wall can be facilitated or enhanced by using a dividing wall with increased insulating properties, such as a dividing wall composed of two wall structures separated by a wall gap. The wall gap can correspond to an air gap, a vacuum gap, or another convenient type of gap that can reduce or minimize heat transfer between the wall structures. In aspects where a dividing wall corresponds to a chord between two points on the circumferential inner wall of the column, the wall structures can be separated by the wall gap along the full length of the walls. Any convenient gap size can be used between the separated wall structures, such as a wall gap of 0.3 inches (~0.7 cm) to 3.0 inches (~7.6 cm), or 0.5 inches (~1.2 cm) to 2.0 inches (~5.1 cm).

Feedstocks

Any convenient type of feedstock that is suitable for separation in a traditional distillation column and/or plurality of columns can be separated using a dividing wall column. Examples of suitable feeds for separation can include, but are not limited to, hydrocarbon (or hydrocarbon-like) feeds. Hydrocarbon-like feeds can include feeds that have one or more heteroatoms other than carbon or hydrogen. Examples of hydrocarbon-like compounds include, but are not limited to, oxygenates (such as alcohols, esters, and ethers), nitrogen-containing compounds (such as amines), and sulfur-containing compounds (such as mercaptans). It is noted that such heteroatoms may be contained in a ring structure, such as a cyclic ether or a thiophene.

In some aspects, a suitable feed (or other fraction) can have a boiling range that includes light ends. For example, the lower end of the boiling range can be sufficiently low to include $C_1$ hydrocarbons, or sufficiently low to include $C_2$ hydrocarbons (but exclude $C_1$ hydrocarbons), or sufficiently low to include $C_3$ hydrocarbons (but exclude $C_2$ hydrocarbons), or sufficiently low to include $C_4$ hydrocarbons (but exclude $C_3$ hydrocarbons). For example, a feed (or other fraction) that includes various types of light ends can have a boiling range defined by an initial boiling point to a T90 distillation point of $C_1$ to 350° C., or $C_1$ to 270° C., or $C_1$ to 200° C., or $C_1$ to 150° C. As another example, a feed (or other fraction) that includes $C_2$ hydrocarbons can have a boiling range defined by an initial boiling point to a T90 distillation point of $C_2$ to 350° C., or $C_2$ to 270° C., or $C_2$ to 200° C., or $C_2$ to 150° C. As still another example, a feed (or other fraction) that includes $C_3$ hydrocarbons can have a boiling range defined by an initial boiling point to a T90 distillation point of $C_3$ to 350° C., or $C_3$ to 270° C., or $C_3$ to 200° C., or $C_3$ to 150° C. As yet another example, a feed (or other fraction) that includes $C_4$ hydrocarbons can have a boiling range defined by an initial boiling point to a T90 distillation point of $C_4$ to 350° C., or $C_4$ to 270° C., or $C_4$ to 200° C., or $C_4$ to 150° C. As still another example, a feed (or other fraction) that includes $C_5$ hydrocarbons can have a boiling range defined by an initial boiling point to a T90 distillation point of $C_5$ to 350° C., or $C_5$ to 270° C., or $C_5$ to 200° C., or $C_5$ to 150° C.

In other aspects, a suitable feed can have a T10 distillation point of at least 60° C., or at least 90° C., or at least 120° C. In some aspects, a suitable feed can have a T90 distillation point of 350° C. or less, or 300° C. or less or 270° C. or less, or 200° C. or less, or 150° C. or less. For example, suitable feeds can have a T10/T90 distillation range of at least 60° C. to 150° C. or less, or at least 60° C. to 200° C. or less, or at least 60° C. to 300° C. or less, or at least 90° C. to 200° C. or less, or at least 90° C. to 270° C. or less, or at least 120° C. to 300° C. or less, or at least 120° C. to 350° C. or less. It is noted that feeds with still higher T90 distillation points may be suitable for separation, as such higher boiling portions of a feed can form a "bottoms" fraction while the lower boiling portions correspond to the products withdrawn from various divided volumes.

As an example, a feed composed of primarily benzene, toluene, xylene along with light ends and heavy components as impurities. The corresponding separation could produce at least 5 products, corresponding to a light ends product, a heavy product, and products substantially corresponding to benzene, toluene, and xylene. Such a separation could be performed in a dividing wall column separator having two dividing walls, with the benzene, toluene, and mixed xylene products being withdrawn from different divided volumes in the tower sections defined by a dividing wall and the interior wall of the column.

As another example, a suitable feed can correspond to a feed that includes hydrocarbons (or hydrocarbon-like compounds) containing 6 or more carbons per compound. In such an example, a dividing wall distillation column could be used to form 6 products. A top product could correspond to a $C_9$ or lighter product while a bottoms product could correspond to a $C_{18}$ or heavier product. The divided volumes from one tower section could be used to withdraw a $C_{10}$-$C_{11}$ product and a $C_{14}$-$C_{15}$ product, while divided volumes from a second tower section could be used to withdraw a $C_{12}$-$C_{13}$ product and a $C_{16}$-$C_{17}$ product.

Configuration Example

FIG. 1 schematically shows an example of a configuration for a dividing wall column including two dividing walls. The dividing walls in FIG. 1 correspond to walls made from a plurality of wall segments, with at least one wall segment that is offset horizontally from other wall segments.

In FIG. 1, a fractionation column includes a top common volume 110, a bottom common volume 190, and a plurality of other volumes in an intermediate volume 150. The start of top common volume 110 is indicated by height indicator 111, while the start of bottom common volume 190 is indicated by height indicator 191.

Bottom common volume 190 includes a bottom product withdrawal 195 for providing a product stream that is at least partially sent to a reboiler (not shown) for heating to maintain the temperature of the fractionation column. The heated product stream is returned to the fractionation column via the reboiler return 193. Any convenient type of reboiler return 193 may be used, including but not limited to, a flush nozzle, a pipe distributor, a vane distributor, or a baffle distributor.

Top common volume 110 includes an optional embedded overhead condenser 113 and a top product withdrawal 115, for withdrawal of a lowest boiling product from the feedstock. Optionally, a plurality of product withdrawals for different boiling ranges can be included as part of top common volume 110. For the product withdrawals other than bottom product withdrawal 195, various additional internal structures can be associated with the product withdrawal location. For example, for top product withdrawal 115, the liquid for withdrawal is collected in a chimney tray 120. A portion of the liquid becomes product for withdrawal 115, while a remaining portion is returned 117 to a liquid distributor 127 to allow for further distillation. The liquid portion returned 117 to liquid distributor 127 passes downward into packed bed 130, where the liquid can contact upward-moving heated vapor. This can potentially cause some volatilization of the downward-moving liquid, while also potentially causing some condensation of the upward-moving vapor. The upward-moving vapor can continue moving upward until either the vapor condenses and is withdrawn as part of a product withdrawal or until the vapor exits through a gas phase withdrawal location (not shown). The downward-moving liquid that exits from the packed bed can drop into the next lower chimney tray 140 for possible withdrawal as part of product withdrawal 145. In the example shown in FIG. 1, two products can be withdrawn from the top common volume.

The processes of vapor moving upward and liquid moving downward also occur in the various divided volumes within the fractionation column. The example shown in FIG. 1 includes multiple divided volumes, each including a packed bed, a flow distributor above the packed bed, and a chimney tray/liquid withdrawal tray below the packed bed. The example in FIG. 1 also includes tower section 160, which corresponds to the tower section between dividing wall 156 and the vessel wall 105 (could also be referred to as column wall) of the fractionator, and tower section 180, which corresponds to the tower section between dividing wall 158 and vessel wall 105. It is noted that a top cross-sectional view of dividing walls 156 and 158 is also presented in FIG. 1. Tower section 160 includes divided volumes 262, 264, 266, and 268. In the example shown in FIG. 1, products can be withdrawn at withdrawal location 165 associated with divided volume 262, and at withdrawal location 169 associated with divided volume 264. Optionally, products could also be withdrawn from locations (not shown) associated with divided volumes 266 and 268. Tower section 180 includes divided volume 284. It is noted that packed bed 277 does not correspond to a divided volume, in part because chimney tray 377 receives liquid from both packed bed 277 and packed bed 177. By contrast, divided volume 179 does qualify as a divided volume, since the packed bed has an associated flow distributor and chimney tray that all share a common dividing wall.

In the example shown in FIG. 1, feed entry volume 174 corresponds to a volume where feedstock for separation is introduced into the column via feed inlet 101. Divided volumes 171 and 179 can optionally include product withdrawal locations, but in some preferred aspects, product withdrawals can be limited to divided volumes that are not in direct fluid communication with a volume that contains a feed inlet. For example, even though a withdrawal location 352 is available in divided volume 171, in the example shown in FIG. 1, the withdrawal location would be used to control the liquid split to each side of the dividing wall and not as an intermediate mixed product. Similarly, withdrawal location 359 could produce an intermediate product, but in FIG. 1 the withdrawal location 359 is used for flow regulation.

In FIG. 1, dividing wall 156 includes at least two wall sections 253 and 257, with wall section 257 being horizontally offset from wall section 253. Having wall section 257 offset toward the center of the column can provide additional volume for divided volume 266, based on the higher vapor loading that can be expected in lower portion of the side drawoff product sections of the column. Having substantially parallel wall sections that are horizontally offset can reduce or minimize waste volume and increase column volume utilization compared to having angled wall sections. Similarly, dividing wall 158 includes at least two wall sections 283 and 287.

As illustrated in FIG. 1, the internal structures within the column can differ on the opposite sides of a dividing wall. For example, the packed bed in divided volume 264 is shown as having a larger depth than the corresponding packed bed associated with divided volume 224 on the opposite side of dividing wall 156. As a result, the chimney tray associated with divided volume 264 is at a lower elevation than the corresponding chimney tray associated with divided volume 224 on the opposite side of dividing wall 156.

In the example shown in FIG. 1, dividing walls 156 and 158 have different total lengths, different top heights 206 and 208 relative to the column height, and different bottom heights 216 and 218 relative to the column height. In various aspects, any convenient dividing wall can have the highest top height and/or the lowest bottom height. It is noted that top heights 206 and 208 correspond to the liquid splits in the example shown in FIG. 1, while bottom heights 216 and 218 correspond to the vapor splits.

In FIG. 1, side drawoff products can be withdrawn from the column at withdrawal locations 165, 169, and 185. Optionally but preferably, the side drawoff product withdrawn at location 185 can have a boiling range that is between the boiling range for the side drawoff product withdrawn at location 165 and the side drawoff product withdrawn at location 169. By having a higher relative volatility in boiling ranges between the side drawoff products from locations 165 and 169, the packed bed associated with divided volume 264 can have a lower number of equivalent trays than would otherwise be needed for side drawoff products with adjacent boiling ranges.

Other Configuration Examples

Figure 2:
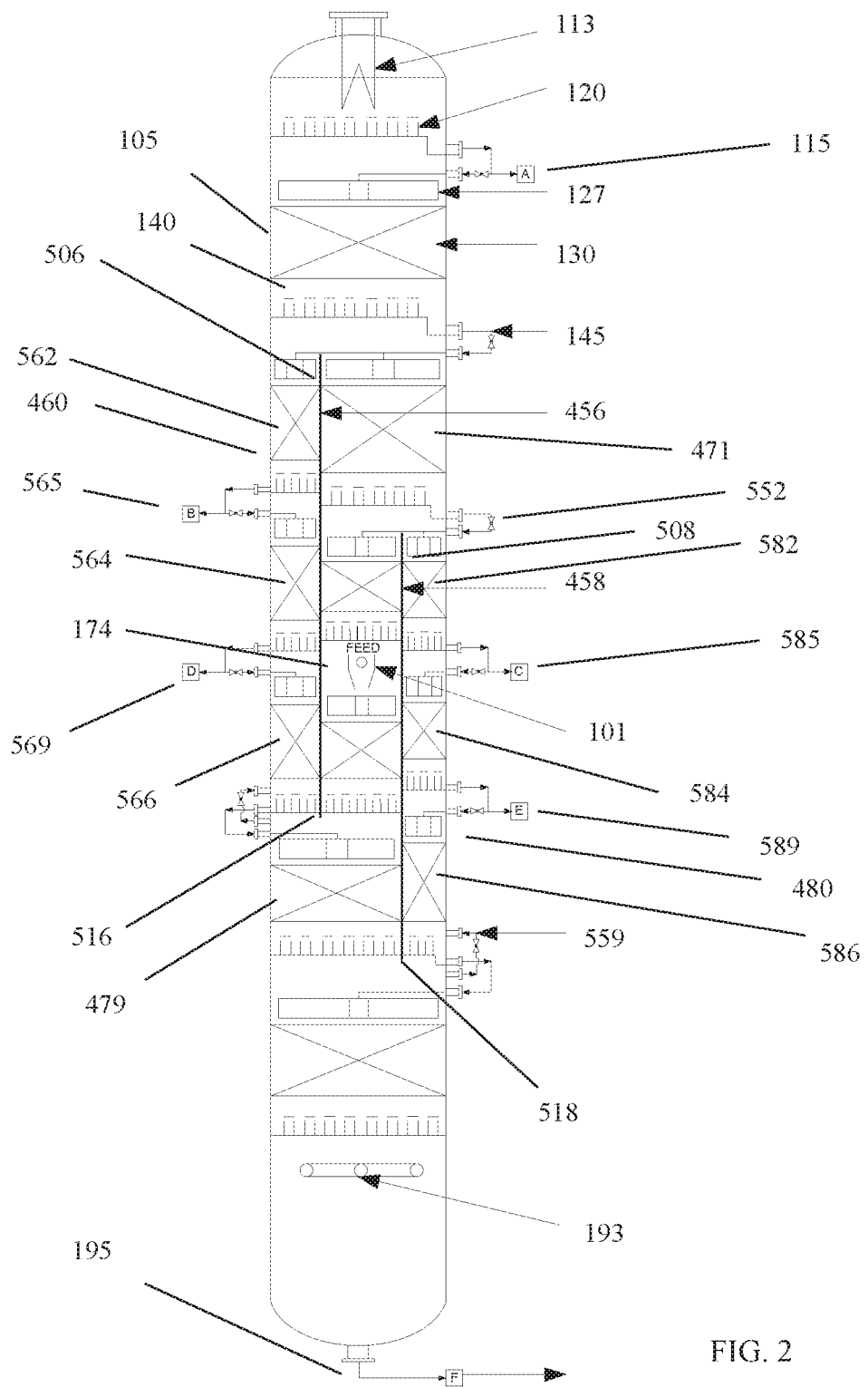
FIG. 2 shows an example of a dividing wall column configuration that allows for separation of at least six products from a feed while having two vapor splits and two liquid splits within the column.

FIG. 2 shows another example of a dividing wall column configuration. In FIG. 2, six products are generated from a configuration that includes two vapor splits and two liquid splits. In FIG. 2, elements that are similar to FIG. 1 are indicated with similar numbers.

In the configuration shown in FIG. 2, the relative elevations for the top 506 of dividing wall 456 and the top 508 of dividing wall 458 are different from the corresponding elevations in FIG. 1, as are the relative elevations of bottom 516 of dividing wall 456 and bottom 518 of dividing wall 458. Dividing walls 456 and 458 are also both represented as straight walls, with no sections that are horizontally offset. Tower section 460 includes divided volumes 562, 564, and 566. Tower section 480 includes divided volumes 582, 584, and 586. It is noted that the chimney tray below the packed bed in divided volume 586 is also divided by dividing wall 458. This is in contrast to the final packed bed 277 in tower section 180 of FIG. 1, where the chimney tray 387 is below the level of dividing wall 158.

The positions of walls 456 and 458 can facilitate withdrawal of a) product 565 from divided volume 562; b) product 569 from divided volume 564; c) product 585 from divided volume 582; and d) product 589 from divided volume 584. In the example shown in FIG. 2, products are not withdrawn from divided volumes 566 and 586.

In the example shown in FIG. 2, feed entry volume 174 corresponds to a volume where feedstock for separation is introduced into the column via feed inlet 101. Divided volumes 471 and 479 can optionally include product withdrawal locations, but in some preferred aspects, product withdrawals can be limited to divided volumes that are not in direct fluid communication with a volume that contains a feed inlet. For example, even though a withdrawal location 552 is available in divided volume 471, in the example shown in FIG. 2, the withdrawal location would be used to control the liquid split to each side of the dividing wall and not as an intermediate mixed product. Similarly, withdrawal location 559 could produce an intermediate product from divided volume 479, but in FIG. 1 the withdrawal location 559 is used for flow regulation.

Figure 3:
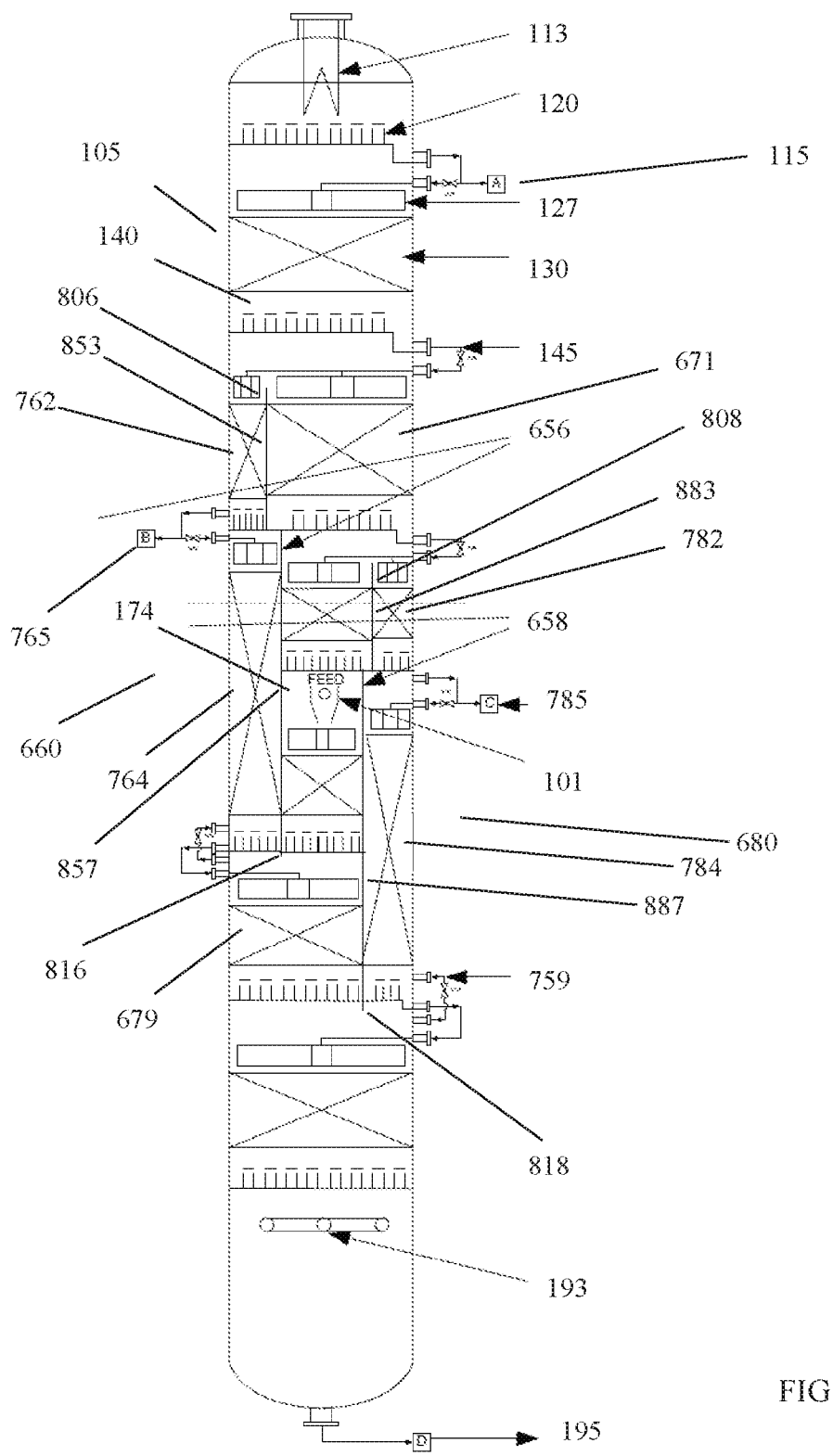
FIG. 3 shows an example of a dividing wall column configuration including one or more staggered dividing walls that allows for separation of at least four products from a feed.

FIG. 3 shows still another example of a dividing wall column configuration. In FIG. 3, four products are generated from a configuration that includes at least one dividing wall with a horizontal stagger or offset.

In the configuration shown in FIG. 3, the relative elevations for the top 806 of dividing wall 656 and the top 808 of dividing wall 658 are different from the corresponding elevations in FIG. 1 or FIG. 2, as are the relative elevations of bottom 816 of dividing wall 656 and bottom 818 of dividing wall 658. Dividing wall 656 includes at least two wall sections 853 and 857, with wall section 857 being horizontally offset from wall section 853. Having wall section 857 offset toward the center of the column can provide additional volume for divided volume 764, based on the higher vapor loading that can be expected in lower portion of the side drawoff product sections of the column. Having substantially parallel wall sections that are horizontally offset can reduce or minimize waste volume and increase column volume utilization compared to having angled wall sections. Similarly, dividing wall 658 includes at least two wall sections 883 and 887. Tower section 660 includes divided volumes 762 and 764. Tower section 680 includes divided volumes 782 and 784.

The positions of walls 656 and 658 can facilitate withdrawal of product 765 from divided volume 762 and product 785 from divided volume 782.

In the example shown in FIG. 3, feed entry volume 174 corresponds to a volume where feedstock for separation is introduced into the column via feed inlet 101. Divided volumes 671 and 679 can optionally include product withdrawal locations, but in some preferred aspects, product withdrawals can be limited to divided volumes that are not in direct fluid communication with a volume that contains a feed inlet.

Additional Embodiments

Embodiment 1. A method for separating a feed into a plurality of products, comprising: passing a feed into a feed entry volume defined by a first dividing wall and a second dividing wall in a distillation column, an interior of the distillation column comprising two or less liquid splits and two or less vapor splits, the feed entry volume being in fluid communication with a top common volume and in fluid communication with a bottom common volume; withdrawing, from a first divided volume of the distillation column, a first product stream, the first divided volume being located in a first tower section defined in part by the first dividing wall; withdrawing, from a second divided volume of the distillation column, a second product which is less volatile based on normal boiling point than the first product stream, the second divided volume being located in a second tower section defined in part by the second dividing wall; withdrawing, from a third divided volume of the distillation column, a third product stream which is less volatile based on normal boiling point than the second product stream, the third divided volume being located in the first tower section; withdrawing, from the bottom common volume, a bottom product stream; and withdrawing a top product stream from above a top packed bed of the distillation column.

Embodiment 2. The method of Embodiment 1, further comprising withdrawing, from a fourth divided volume of the distillation column, a fourth product stream which is less volatile based on normal boiling point than the third product stream, the fourth divided volume being located in the second tower section.

Embodiment 3. A method for separating a feed into a plurality of products, comprising: passing a feed into a feed entry volume defined by a first dividing wall and a second dividing wall in a distillation column, an interior of the distillation column comprising two or less liquid splits and two or less vapor splits, the feed entry volume being in fluid communication with a top common volume and in fluid communication with a bottom common volume; withdrawing, from a first divided volume of the distillation column, a first product stream, the first divided volume being located in a first tower section defined in part by the first dividing wall; withdrawing, from a second divided volume of the distillation column, a second product stream which is less volatile based on normal boiling point than the first product stream, the second divided volume being located in a second tower section defined in part by the second dividing wall; withdrawing, from a third divided volume of the distillation column, a third product stream which is less volatile based on normal boiling point than the second product stream, the third divided volume being located in the first tower section; withdrawing, from a fourth divided volume of the distillation column, a fourth product stream which is less volatile based on normal boiling point than the third product stream, the fourth divided volume being located in the second tower section; withdrawing, from the bottom common volume, a bottom product stream; and withdrawing a top product stream from above a top packed bed of the distillation column.

Embodiment 4. A method for separating a feed into a plurality of products, comprising: passing a feed into a feed entry volume defined by a first dividing wall and a second dividing wall in a distillation column, an interior of the distillation column comprising two or less liquid splits and two or less vapor splits, the feed entry volume being in fluid communication with a top common volume and in fluid communication with a bottom common volume; withdrawing, from a first divided volume of the distillation column, a first product stream, the first divided volume being located in a first tower section defined in part by the first dividing wall; withdrawing, from a second divided volume of the distillation column, a second product stream which is less volatile based on normal boiling point than the first product stream, the second divided volume being located in a second tower section defined in part by the second dividing wall; withdrawing, from the bottom common volume, a bottom product stream; and withdrawing a top product stream from above a top packed bed of the distillation column, wherein at least one of the first dividing wall and the second dividing wall comprises a plurality of substantially parallel dividing wall sections, at least one dividing wall section of the plurality of substantially parallel dividing wall sections being horizontally offset from at least one other dividing wall section of the plurality of substantially parallel dividing wall sections.

Embodiment 5. The method of any of the above embodiments, wherein a temperature differential between a divided volume in the first tower section (optionally the first divided volume) and a location on an opposing side of the first dividing wall is 10° C. to 35° C.; or wherein a temperature differential between a divided volume in the second tower section (optionally the second divided volume) and a location on an opposing side of the second dividing wall is 10° C. to 35° C.; or a combination thereof.

Embodiment 6. The method of Embodiment 5, wherein the first dividing wall comprises a first wall structure and a second wall structure separated by a wall gap of 0.7 cm to 7.6 cm (or 1.2 cm to 5.1 cm); or wherein the second dividing wall comprises a first wall structure and a second wall structure separated by a wall gap of 0.7 cm to 7.6 cm (or 1.2 cm to 5.1 cm); or a combination thereof.

Embodiment 7. The method of any of the above embodiments, wherein the distillation column comprises a plurality of horizontally adjacent packed beds on opposing sides of the first dividing wall, and wherein each packed bed in the first tower section comprises an average percent vapor flood that is within 10% of an average percent vapor flood of the horizontally adjacent packed bed on the opposing side of the first dividing wall; or wherein the distillation column comprises a plurality of horizontally adjacent packed beds on opposing sides of the second dividing wall, and wherein each packed bed in the second tower section comprises an average percent vapor flood that is within 10% of an average percent vapor flood of the horizontally adjacent packed bed on the opposing side of the second dividing wall; or a combination thereof.

Embodiment 8. The method of Embodiment 7, wherein a) a vapor split ratio for a vapor split associated with the first dividing wall at a first feed rate is substantially similar to a vapor split ratio for the vapor split associated with the first dividing wall at a second feed rate; b) a vapor split ratio for a vapor split associated with the second dividing wall at a first feed rate is substantially similar to a vapor split ratio for the vapor split associated with the second dividing wall at a second feed rate; or c) a combination of a) and b), and wherein the first feed rate and the second feed rate differ by at least 25%.

Embodiment 9. A system for separating a feed into a plurality of products, comprising: a distillation column comprising a top common volume, a bottom common volume, an intermediate volume, and a column wall; a first dividing wall and a second dividing wall in the intermediate volume, the first dividing wall and the second dividing wall defining at least a feed entry volume, the first dividing wall and the column wall defining a first tower section comprising a first plurality of divided volumes, the second dividing wall and the column wall defining a second tower section comprising a second plurality of divided volumes, an interior of the distillation column comprising two or less liquid splits and two or less vapor splits; a feedstock inlet in fluid communication with the feed entry volume; at least one top outlet in fluid communication with the top common volume or with a volume above a top packed bed; at least one bottom outlet in fluid communication with the bottom common volume; a first outlet in fluid communication with a first divided volume of the first plurality of divided volumes; a second outlet in fluid communication with a second divided volume of the second plurality of divided volumes; and a third outlet in fluid communication with a third divided volume of the first plurality of divided volumes, an elevation of the third outlet being lower than an elevation of the first outlet, wherein i) a top of the first dividing wall is at a different height within the distillation tower than a top of the second dividing wall; ii) a bottom of the first dividing wall is at a different height within the distillation tower than a bottom of the second dividing wall; or iii) a combination of i) and ii).

Embodiment 10. The system of Embodiment 9, further comprising a fourth outlet in fluid communication with a fourth divided volume of the second plurality of divided volumes, an elevation of the fourth outlet being lower than an elevation of the second outlet.

Embodiment 11. The system of Embodiment 9 or 10, wherein the top of the first dividing wall is higher than the top of the second dividing wall, and wherein the bottom of the first dividing wall is higher than the bottom of the second dividing wall.

Embodiment 12. A system for separating a feed into a plurality of products, comprising: a distillation column comprising a top common volume, a bottom common volume, an intermediate volume, and a column wall; a first dividing wall and a second dividing wall in the intermediate volume, the first dividing wall and the second dividing wall defining at least a feed entry volume, the first dividing wall and the column wall defining a first tower section comprising a first plurality of divided volumes, the second dividing wall and the column wall defining a second tower section comprising a second plurality of divided volumes, an interior of the distillation column comprising two or less liquid splits and two or less vapor splits; a feedstock inlet in fluid communication with the feed entry volume; at least one top outlet in fluid communication with the top common volume or with a volume above a top packed bed; at least one bottom outlet in fluid communication with the bottom common volume; a first outlet in fluid communication with a first divided volume of the first plurality of divided volumes; and a second outlet in fluid communication with a second divided volume of the second plurality of divided volumes, wherein at least one of the first dividing wall and the second dividing wall comprises a plurality of substantially parallel dividing wall sections, at least one dividing wall section of the plurality of substantially parallel dividing wall sections being horizontally offset from at least one other dividing wall section of the plurality of substantially parallel dividing wall sections, and wherein i) a top of the first dividing wall is at a different height within the distillation tower than a top of the second dividing wall; ii) a bottom of the first dividing wall is at a different height within the distillation tower than a bottom of the second dividing wall; or iii) a combination of i) and ii).

Embodiment 13. The system of any of Embodiments 9-12, wherein the first dividing wall comprises a first wall structure and a second wall structure separated by a wall gap of 0.7 cm to 7.6 cm (or 1.2 cm to 5.1 cm); or wherein the second dividing wall comprises a first wall structure and a second wall structure separated by a wall gap of 0.7 cm to 7.6 cm (or 1.2 cm to 5.1 cm); or a combination thereof.

Embodiment 14. The system or method of any of the above embodiments, wherein a packing type, a packing size, or a combination thereof in at least one packed bed in the first tower section is different from a packing type, a packing size, or a combination thereof on an opposing side of the first dividing wall; or wherein a packing type, a packing size, or a combination thereof in at least one packed bed in the second tower section is different from a packing type, a packing size, or a combination thereof on an opposing side of the second dividing wall; or a combination thereof.

Embodiment 15. The system or method of Embodiment 14, wherein the at least one packed bed in the first tower section comprises a packed bed in the first divided volume, or wherein the at least one packed bed in the first tower section comprises a packed bed different from the packed bed in the first divided volume; or wherein the at least one packed bed in the second tower section comprises a packed bed in the second divided volume; or wherein the at least one packed bed in the second tower section comprises a packed bed different from the packed bed in the second divided volume; or a combination thereof.

Embodiment 16. The system or method of any of Embodiments 1-3, 5-11 or 13-15, wherein at least one of the first dividing wall and the second dividing wall comprises a plurality of substantially parallel dividing wall sections, at least one dividing wall section of the plurality of substantially parallel dividing wall sections being horizontally offset from at least one other dividing wall section of the plurality of substantially parallel dividing wall sections.

Embodiment 17. Use of a system according to any of Embodiments 9-16 to separate a feed into a plurality of products.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for separating a feed into a plurality of products, comprising:
   passing a feed into a feed entry volume defined by a first dividing wall and a second dividing wall in a distillation column, an interior of the distillation column comprising two or less liquid splits and two or less vapor splits, the feed entry volume being in fluid communication with a top common volume and in fluid communication with a bottom common volume;
   withdrawing, from a first divided volume of the distillation column, a first product stream, the first divided volume being located in a first tower section defined in part by the first dividing wall;
   withdrawing, from a second divided volume of the distillation column, a second product which is less volatile based on normal boiling point than the first product stream, the second divided volume being located in a second tower section defined in part by the second dividing wall;
   withdrawing, from a third divided volume of the distillation column, a third product stream which is less volatile based on normal boiling point than the second product stream, the third divided volume being located in the first tower section;
   withdrawing, from the bottom common volume, a bottom product stream; and
   withdrawing a top product stream from above a top packed bed of the distillation column.

2. The method of claim 1, further comprising withdrawing, from a fourth divided volume of the distillation column, a fourth product stream which is less volatile based on normal boiling point than the third product stream, the fourth divided volume being located in the second tower section.

3. The method of claim 1, wherein at least one of the first dividing wall and the second dividing wall comprises a plurality of substantially parallel dividing wall sections, at least one dividing wall section of the plurality of substantially parallel dividing wall sections being horizontally offset from at least one other dividing wall section of the plurality of substantially parallel dividing wall sections.

4. The method of claim 1, wherein a temperature differential between a divided volume in the first tower section and a location on an opposing side of the first dividing wall is 10° C. to 35° C.

5. The method of claim 4, wherein the first dividing wall comprises a first wall structure and a second wall structure separated by a wall gap of 0.7 cm to 7.6 cm.

6. The method of claim 4, wherein the temperature differential between the divided volume in the first tower section and a location on the opposing side of the first dividing wall comprises a temperature differential between the first divided volume and a location on the opposing side of the first dividing wall.

7. The method of claim 1, wherein a temperature differential between a divided volume in the second tower section and a location on an opposing side of the second dividing wall is 10° C. to 35° C.

8. The method of claim 7, wherein the second dividing wall comprises a first wall structure and a second wall structure separated by a wall gap of 0.7 cm to 7.6 cm.

9. The method of claim 7 wherein the temperature differential between the divided volume in the second tower section and a location on the opposing side of the second dividing wall comprises a temperature differential between the second divided volume and a location on the opposing side of the second dividing wall.

10. The method of claim 1, wherein a packing type, a packing size, or a combination thereof in at least one packed bed in the first tower section is different from a packing type, a packing size, or a combination thereof on an opposing side of the first dividing wall; or wherein a packing type, a packing size, or a combination thereof in at least one packed bed in the second tower section is different from a packing type, a packing size, or a combination thereof on an opposing side of the second dividing wall; or a combination thereof.

11. The method of claim 10, wherein the at least one packed bed in the first tower section comprises a packed bed in the first divided volume; or wherein the at least one packed bed in the first tower section comprises a packed bed different from the packed bed in the first divided volume; or wherein the at least one packed bed in the second tower section comprises a packed bed in the second divided volume; or wherein the at least one packed bed in the second tower section comprises a packed bed different from the packed bed in the second divided volume; or a combination thereof.

12. The method of claim 1, wherein the distillation column comprises a plurality of horizontally adjacent packed beds on opposing sides of the first dividing wall, and wherein each packed bed in the first tower section comprises an average percent vapor flood that is within 10% of an average percent vapor flood of the horizontally adjacent packed bed on the opposing side of the first dividing wall; or wherein the distillation column comprises a plurality of horizontally adjacent packed beds on opposing sides of the second dividing wall, and wherein each packed bed in the second tower section comprises an average percent vapor flood that is within 10% of an average percent vapor flood of the horizontally adjacent packed bed on the opposing side of the second dividing wall; or a combination thereof.

13. The method of claim 12, wherein a) a vapor split ratio for a vapor split associated with the first dividing wall at a first feed rate is substantially similar to a vapor split ratio for the vapor split associated with the first dividing wall at a second feed rate; b) a vapor split ratio for a vapor split associated with the second dividing wall at a first feed rate is substantially similar to a vapor split ratio for the vapor split associated with the second dividing wall at a second feed rate; or c) a combination of a) and b), and wherein the first feed rate and the second feed rate differ by at least 25%.

14. A method for separating a feed into a plurality of products, comprising:
   passing a feed into a feed entry volume defined by a first dividing wall and a second dividing wall in a distillation column, an interior of the distillation column comprising two or less liquid splits and two or less vapor splits, the feed entry volume being in fluid communication with a top common volume and in fluid communication with a bottom common volume;

withdrawing, from a first divided volume of the distillation column, a first product stream, the first divided volume being located in a first tower section defined in part by the first dividing wall;

withdrawing, from a second divided volume of the distillation column, a second product stream which is less volatile based on normal boiling point than the first product stream, the second divided volume being located in a second tower section defined in part by the second dividing wall;

withdrawing, from a third divided volume of the distillation column, a third product stream which is less volatile based on normal boiling point than the second product stream, the third divided volume being located in the first tower section;

withdrawing, from a fourth divided volume of the distillation column, a fourth product stream which is less volatile based on normal boiling point than the third product stream, the fourth divided volume being located in the second tower section;

withdrawing, from the bottom common volume, a bottom product stream; and withdrawing a top product stream from above a top packed bed of the distillation column.

15. A method for separating a feed into a plurality of products, comprising:

passing a feed into a feed entry volume defined by a first dividing wall and a second dividing wall in a distillation column, an interior of the distillation column comprising two or less liquid splits and two or less vapor splits, the feed entry volume being in fluid communication with a top common volume and in fluid communication with a bottom common volume;

withdrawing, from a first divided volume of the distillation column, a first product stream, the first divided volume being located in a first tower section defined in part by the first dividing wall;

withdrawing, from a second divided volume of the distillation column, a second product stream which is less volatile based on normal boiling point than the first product stream, the second divided volume being located in a second tower section defined in part by the second dividing wall;

withdrawing, from the bottom common volume, a bottom product stream; and withdrawing a top product stream from above a top packed bed of the distillation column, wherein at least one of the first dividing wall and the second dividing wall comprises a plurality of substantially parallel dividing wall sections, at least one dividing wall section of the plurality of substantially parallel dividing wall sections being horizontally offset from at least one other dividing wall section of the plurality of substantially parallel dividing wall sections.

16. A system for separating a feed into a plurality of products, comprising:

a distillation column comprising a top common volume, a bottom common volume, an intermediate volume, and a column wall;

a first dividing wall and a second dividing wall in the intermediate volume, the first dividing wall and the second dividing wall defining at least a feed entry volume, the first dividing wall and the column wall defining a first tower section comprising a first plurality of divided volumes, the second dividing wall and the column wall defining a second tower section comprising a second plurality of divided volumes, an interior of the distillation column comprising two or less liquid splits and two or less vapor splits;

a feedstock inlet in fluid communication with the feed entry volume;

at least one top outlet in fluid communication with the top common volume or with a volume above a top packed bed;

at least one bottom outlet in fluid communication with the bottom common volume;

a first outlet in fluid communication with a first divided volume of the first plurality of divided volumes;

a second outlet in fluid communication with a second divided volume of the second plurality of divided volumes; and a third outlet in fluid communication with a third divided volume of the first plurality of divided volumes, an elevation of the third outlet being lower than an elevation of the first outlet, wherein i) a top of the first dividing wall is at a different height within the distillation tower than a top of the second dividing wall; ii) a bottom of the first dividing wall is at a different height within the distillation tower than a bottom of the second dividing wall; or iii) a combination of i) and ii).

17. The system of claim 16, further comprising a fourth outlet in fluid communication with a fourth divided volume of the second plurality of divided volumes, an elevation of the fourth outlet being lower than an elevation of the second outlet.

18. The system of claim 16, wherein at least one of the first dividing wall and the second dividing wall comprises a plurality of substantially parallel dividing wall sections, at least one dividing wall section of the plurality of substantially parallel dividing wall sections being horizontally offset from at least one other dividing wall section of the plurality of substantially parallel dividing wall sections.

19. The system of claim 16, wherein the top of the first dividing wall is higher than the top of the second dividing wall, and wherein the bottom of the first dividing wall is higher than the bottom of the second dividing wall.

20. The system of claim 16, wherein the first dividing wall comprises a first wall structure and a second wall structure separated by a wall gap of 0.7 cm to 7.6 cm; or wherein the second dividing wall comprises a first wall structure and a second wall structure separated by a wall gap of 0.7 cm to 7.6 cm; or a combination thereof.

21. The system of claim 16, wherein a packing type, a packing size, or a combination thereof in at least one packed bed in the first tower section is different from a packing type, a packing size, or a combination thereof on an opposing side of the first dividing wall; or wherein a packing type, a packing size, or a combination thereof in at least one packed bed in the second tower section is different from a packing type, a packing size, or a combination thereof on an opposing side of the second dividing wall; or a combination thereof.

22. The system of claim 21, wherein the at least one packed bed in the first tower section comprises a packed bed in the first divided volume, or wherein the at least one packed bed in the first tower section comprises a packed bed different from the packed bed in the first divided volume; or wherein the at least one packed bed in the second tower section comprises a packed bed in the second divided volume; or wherein the at least one packed bed in the second tower section comprises a packed bed different from the packed bed in the second divided volume; or a combination thereof.

23. A system for separating a feed into a plurality of products, comprising:
  a distillation column comprising a top common volume, a bottom common volume, an intermediate volume, and a column wall;
  a first dividing wall and a second dividing wall in the intermediate volume, the first dividing wall and the second dividing wall defining at least a feed entry volume, the first dividing wall and the column wall defining a first tower section comprising a first plurality of divided volumes, the second dividing wall and the column wall defining a second tower section comprising a second plurality of divided volumes, an interior of the distillation column comprising two or less liquid splits and two or less vapor splits;
  a feedstock inlet in fluid communication with the feed entry volume;
  at least one top outlet in fluid communication with the top common volume or with a volume above a top packed bed;
  at least one bottom outlet in fluid communication with the bottom common volume;
  a first outlet in fluid communication with a first divided volume of the first plurality of divided volumes; and
  a second outlet in fluid communication with a second divided volume of the second plurality of divided volumes,
  wherein at least one of the first dividing wall and the second dividing wall comprises a plurality of substantially parallel dividing wall sections, at least one dividing wall section of the plurality of substantially parallel dividing wall sections being horizontally offset from at least one other dividing wall section of the plurality of substantially parallel dividing wall sections, and
  wherein i) a top of the first dividing wall is at a different height within the distillation tower than a top of the second dividing wall; ii) a bottom of the first dividing wall is at a different height within the distillation tower than a bottom of the second dividing wall; or iii) a combination of i) and ii).

\* \* \* \* \*